March 26, 1957 J. J. PRESDEE ET AL 2,786,704
CLOSURE SECURING MEANS FOR PRESSURE VESSELS
Filed April 25, 1955 2 Sheets-Sheet 1

INVENTORS:
JOHN J. PRESDEE
EINAR E. TANGARD
BY
Eldon H. Luther
ATTORNEY

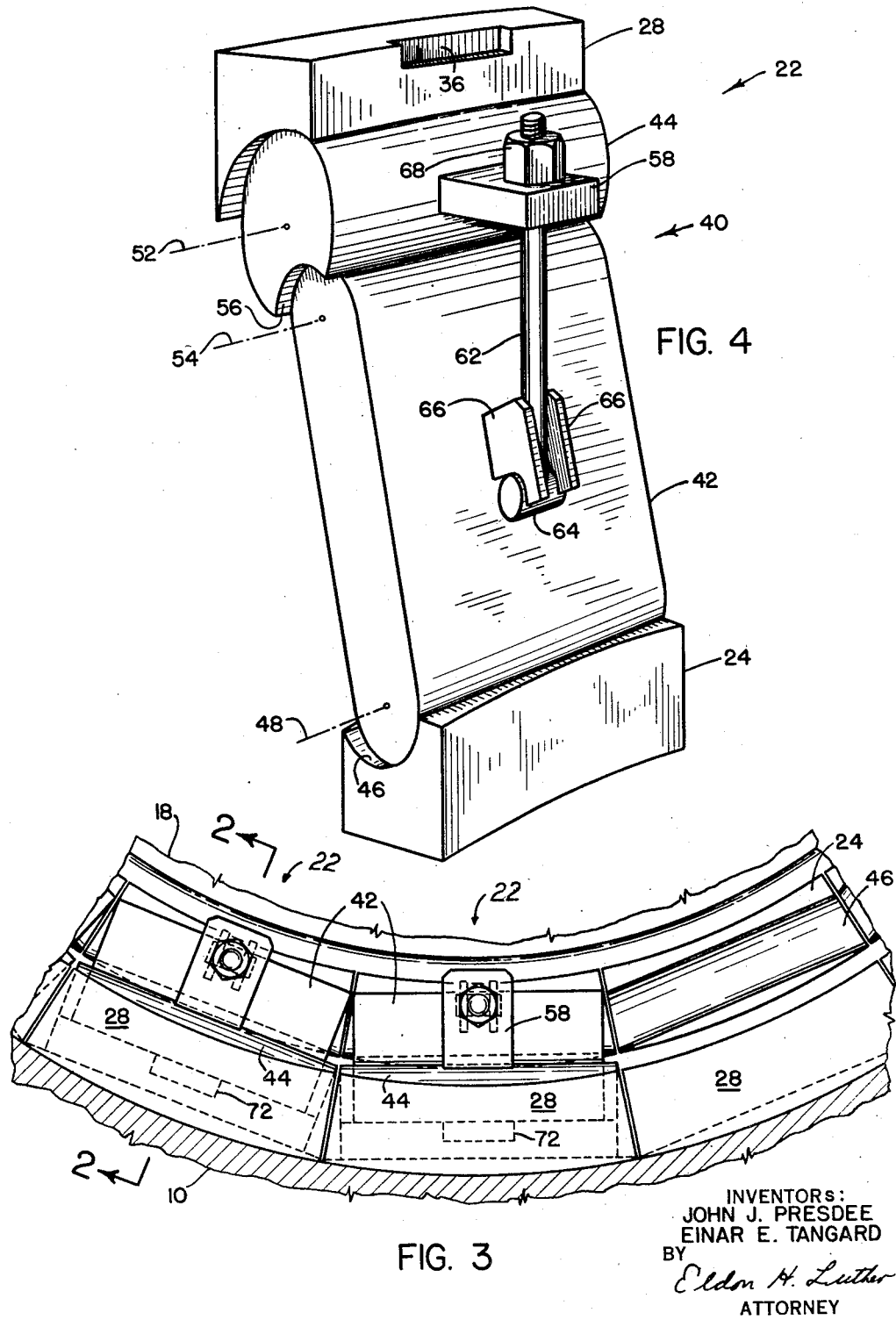

United States Patent Office 2,786,704
Patented Mar. 26, 1957

2,786,704

CLOSURE SECURING MEANS FOR PRESSURE VESSELS

John J. Presdee, Tuckahoe, and Einar E. Tangard, Scarsdale, N. Y., assignors to Combustion Engineering, Inc., New York, N. Y., a corporation of Delaware Application April 25, 1955, Serial No. 503,722

6 Claims. (Cl. 292—256)

This invention relates to pressure vessels provided with removable closures and particularly to vessels of rather large diameter subjected to high internal pressure and having a relatively large closure or closures connected thereto in a fluid tight manner capable of withstanding these high internal pressures as well as external shocks to which the vessels may be subjected and yet capable of being readily removed to permit access to the interior of the vessel.

In certain industrial processes large vessels are employed and are operated at very high internal pressures with it being often required that access openings be provided in these vessels which permit insertion and removal of rather large equipment necessitating the diameter of the access openings in these vessels being as large as practicable and in certain instances being approximately equal to the internal diameter of the vessel. With these very high internal pressures and large diameters it will be appreciated that a very large force is applied to the closures for these access openings rendering the problem of positively securing these closures within the opening in a manner which will permit the closure to be readily removed an extremely difficult one. In addition to withstanding this large force resulting from the high pressure within the vessel the closures must also be secured within the access openings in a manner so as to be capable of withstanding all of the other forces to which they may possibly be subjected and in certain installations, as when the vessel is mounted upon a vehicle or mobile support these forces may be of considerable magnitude.

It is an object of this invention to provide such a pressure vessel with a closure secured within an opening in the vessel in an improved manner which positively retains the closure within the opening against all forces to which the closure is subjected yet permits the closure to be readily removed from the opening when desired.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

Figure 3 is a fragmentary vertical section taken generally on line 3—3 of Fig. 2.

Figure 4 is a detailed perspective view of one of the many locking assemblies disposed about the closure for locking the closure within the opening in the vessel wall.

Figures 1, 2:
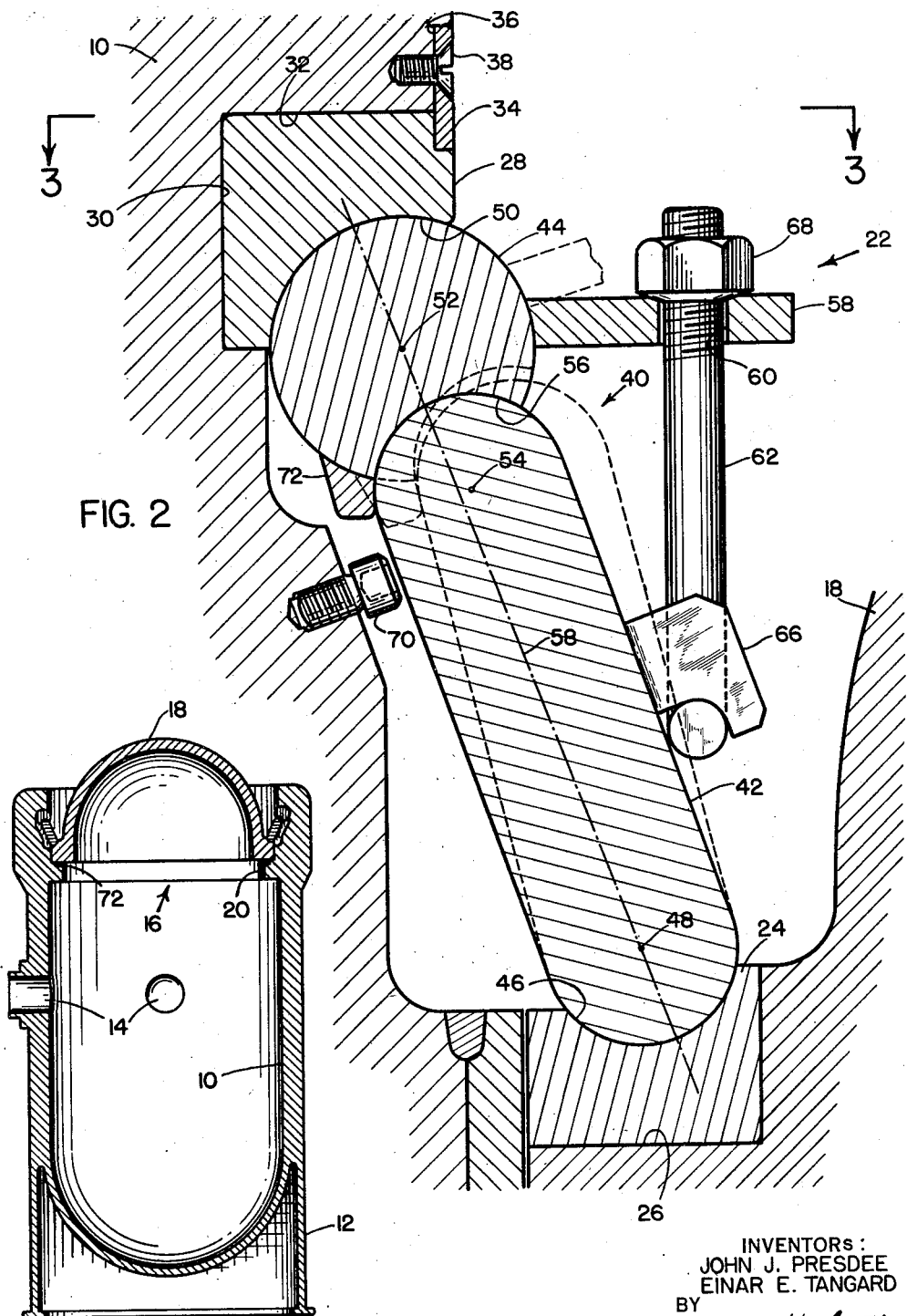
Figure 1 is a vertical sectional view of a pressure vessel embodying the present invention.
Figure 2 is a detailed fragmentary vertical section of the juncture of the closure and the wall of the vessel showing in detail the construction of one of the many locking assemblies for retaining the closure within the opening in the vessel.

Referring now in detail to the drawing, wherein like reference characters are used throughout to designate like elements, the organization of Fig. 1 comprises a pressure vessel 10 which is illustratively disclosed in the form of a cylindrical vessel supported upon skirt 12. This vessel is of large diameter and is provided with an opening 16 at its upper end to permit the insertion and removal of large equipment. In the illustrative vessel relatively small radial openings 14 may be provided in the vertical wall in order to permit the attachment of piping and/or various actuating mechanism to the vessel and instrumentation of the vessel with these openings normally being sealed in a fluid tight manner by means not disclosed herein.

Received within opening 16 is the closure 18 with its innermost end in engagement with the annular stop 20 extending radially inward of opening 16. This closure 18 is forced down upon stop 20 and retained within opening 16 by means of numerous locking assemblies 22 with these locking assemblies being disposed in side-by-side relation about the closure as indicated in Fig. 3 and with one such assembly being shown in perspective in Fig. 4. Each of the locking assemblies 22 comprises a transition block 24 that rests upon annular shoulder 26 formed upon closure 18 and transition block 28 positioned within annular groove 30 formed in the wall of the opening 16 and against shoulder 32 which forms the upper surface of this groove with block 28 being held in place by means of bracket 34 secured within recess 36 by screw 38. Shoulders 26 and 32 are coaxial with opening 16 when closure 18 is disposed in place within the opening and shoulder 32 together with transition block 28 is disposed axially and radially outward of shoulder 26 and transition block 24, respectively, with respect to the axis of opening 16. Each of the transition blocks 24 and 28 is curved as shown in Fig. 3 to fit upon shoulders 26 and 32 respectively in complementary relation with these shoulders. Positioned intermediate these axially and radially spaced transition blocks is the toggle linkage 40 which includes element 42 and element 44. Each of these elements is straight, as shown in Figs. 2 and 3, rather than being curved as are the transition blocks with the lower end of element 42 being generally semicircular and receiving within an upwardly facing complementary groove 46 for pivotal movement about axis 48 which is the axis of this semicircular rounded end. Element 44 which may be generally cylindrical as shown or somewhat elongated as element 42 is received within the generally downward and outwardly facing recess 50 formed in transition block 28 with the coacting surface of this groove and of element 44 being arcuate with the center of the arc lying along axis 52 which is accordingly the axis of these complementary surfaces with element 44 pivoting about this axis.

The elements 42 and 44 may be interconnected or interrelated in any desired way which will result in these elements acting as a toggle linkage as they are rotated about their respective axes 48 and 52 toward the dead center position in the plane containing these axes. In the illustrative organization these elements are interrelated by rounding the upper end of element 42 with the surface of this rounded end being arcuate or semicircular with the center of the arc lying on axis 54 and with this rounded upper end being received within the complementary groove 56 formed in element 44.

As elements 42 and 44 of toggle linkage 40 are rotated about their respective axes 48 and 52 toward their dead center position wherein axes 48, 52 and 54 lie in the common plane, represented in the drawing as 58, the linkage is effective to provide an extremely great mechanical advantage for forcing closure 18 down upon annular stop 20 and the linkage is so proportioned as to effect this result.

Pivotal rotation of the elements 42 and 44 may be had by any suitable means and may be effected by hand such as by pivoting element 42 radially outward about axis 48 by means of a hammer or the like and pivoting this linkage radially inward about this axis by means of a crow bar inserted within a suitable slot formed in the element or in back of a suitable bracket secured to the linkage. However, it is desirable to provide some positive means for moving the elements of linkage 40 toward dead center position and positively retain the elements in their desired position and for this purpose in the illustrative organization there is provided arm 58 extending radially outward from element 42 and having a bore 60 through which extends the upper end of T-bolt 62. The lower end of this bolt which carries the cross arm 64 is received intermediate brackets 66 extending outwardly from element 42 and on the upper end of the bolt is threaded nut 68 which bears down upon surface of arm 58 as it is threaded downwardly upon the bolt. This operating mechanism is thus effective by threading nut 68 downward upon bolt 62, to move toggle linkage 40 toward its dead center position. It will be obvious that the amount of force required to actuate this linkage in this manner is extremely small relative to the resulting force with which the closure 18 is forced down upon the stop 20.

The radial outward pivotal movement of element 42 is preferably limited by the adjustable stop 70 so that toggle linkage 40 is prohibited from moving to or past its dead center position in order that the linkage may be moved back from or out of its locking position without undue difficulty. The element 42 is preferably provided with lip member 72 in order to prevent the edge of recess 56 from gouging or scoring the surface of element 42 during operation of the toggle linkage.

In operation of the organization of the present invention, assuming that opening 16 is in its open position and it is desired to close the same in order to perform whatever process vessel 10 is designed to house, closure 18 is lowered into the opening and into engagement with annular stop 20 which limits the extent to which the closure may be inserted into the opening. The toggle linkage 40 of each of the locking assemblies 22 is then positioned in place as represented in dotted lines in Fig. 2 with the lower end of linkage 42 received within recess 46 of transition block 24 and element 44 received within recess 50 formed in transition block 28. T-bolt 62 is then positioned in place with cross arm 64 received beneath brackets 66 and the upper end of the bolt extending through bore 60 of arm 58. Nut 68 is then threaded downwardly upon each of the T-bolts of each of the locking assemblies causing toggle linkage 40 to move to a position just short of its dead center position with element 42 engaging adjustable stop 70 and with this movement of the toggle linkage forcing the closure firmly downward upon the annular stop 20. The closure is then firmly and positively held in place against both the high internal pressure that may prevail within the vessel 10 and against any shock or other force to which the closure may be subjected due to its being mounted upon a mobile or vehicular support or due to any other reason. To remove the closure it is merely necessary to reverse the procedure followed in assembling it, i. e., unscrew nut 68, remove bolt 62, pivot elements 42 and 44 about their respective axes 48 and 52 to their dotted line position shown in Fig. 2 and then remove these elements after which closure 18 may be withdrawn or removed from opening 16.

In order to provide a fluid tight joint between vessel 10 and closure 18 an annular seal 72 may be provided on the supper surface of annular stop 20 with a fluid tight juncture being formed when locking assemblies 22 force closure 18 firmly down upon the annular stop 20. The particular seal shown is only illustrative, however, since other and different seal organizations may equally well or even more advantageously be employed with the closure of this invention. For example, a welded flexible metallic seal may be used in place of or in addition to the seal shown, or the seal shown may be further protected by a flexible metallic welded seal between the shell of the vessel and the head or any other desired seal may be employed.

Since the elements 42 and 44 of toggle linkage 40 are straight rather than curved like transition blocks 24 and 28 fabrication of these locking assemblies is greatly simplified with this being the prime purpose of these transition blocks. Since elements 42 and 44 are straight the recesses 46 and 50 within which their respective ends are received are likewise straight and while it is a simple task to provide such recesses in these transition blocks it would be difficult to provide these recesses in the closure and wall of the opening although of course this would be possible. If in some cases it would be feasible to machine these recesses in the head and in the shell, then said transition blocks could be omitted.

Another result of the use of transition blocks 24 and 28 is that exacting machining tolerances are not required because shims may be positioned between these blocks and their associated shoulders as necessary in order that each of the locking assemblies will be effective to urge closure 18 downward upon annular stop 20 with the required force.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. In a pressure vessel having an opening of circular transverse section provided therein, the combination of a removable closure adapted to be removably disposed in said opening and having a portion disposed within the opening when occupying its closed position, stop means extending radially inward from the wall of the opening and engageable by the inner end of the closure to limit its insertion into said opening, said closure being provided with an annular outwardly facing shoulder adjacent its periphery and the wall of the opening being provided with a similar annular shoulder opposed to that provided on the closure and spaced axially outward thereof, a plurality of locking assemblies disposed about said closure in side by side relation and intermediate said opposed shoulders for forcing and retaining said closure against said stop means, each of said assemblies including transition blocks in engagement with the shoulders formed on the closure and the wall of the opening and respectively having generally outwardly and inwardly facing recesses formed therein and extending throughout their length, the axes of said recesses being straight and normal to a plane that contains the axis of the opening and passes through said blocks centrally intermediate the lateral extremities thereof, the surfaces of said recesses being arcuate with the center of the arc lying along the respective axis of the recess, a first member received within the outwardly facing recess in complementary relation therewith for pivotal movement about the axis of said outwardly facing recess, a second member received within the inwardly facing recess in complementary relation therewith for pivotal movement about the axis of said inwardly facing recess, said first and second members being interrelated to form a toggle linkage the dead center position of which lies in a plane containing the two pivotal axes, said members being effective to force said closure against said stop means as they are simultaneously pivoted radially outward of the opening toward their dead center position, and means for effecting such pivotal movement of said members.

2. The organization of claim 1 wherein one of the members of the toggle linkage is provided with a recess the axis of which is parallel with the pivotal axes of said members and the surface of which is arcuate with the other member being received within this recess in complementary relation therewith.

3. The organization of claim 1 including means effective to limit the radially outward pivotal movement of said members to prevent the same from being moved past their dead center position.

4. A pressure vessel having an opening therein, a removable closure for said opening, stop means engaged by said closure when in its closed position, said vessel and closure having coaxial annular opposed shoulders with the shoulder formed on the vessel being disposed radially and axially outward of the shoulder formed on the closure, a plurality of locking means positionable intermediate said shoulders and in side-by-side relation throughout the circumferential length of said shoulders, each of said means including a transition block in engagement with and conforming to each of said shoulders with said transition blocks having straight grooves formed therein with the grooves in the two blocks being opposed to each other, a pair of straight members forming a toggle linkage with one end of each member being complementary with and received in the groove in one of the transition blocks for pivotal movement toward and away from the dead center position of the linkage and effective to force and retain the closure against the stop means as the linkage approaches its dead center, and means for effecting such movement of the toggle linkage.

5. A pressure vessel having an opening therein, a removable closure for said opening, stop means engaged by said closure when in its closed position, said vessel and closure having coaxial annular opposed shoulders with the shoulder formed on the vessel being disposed radially and axially outward of the shoulder formed on the closure, a plurality of locking means positionable intermediate said shoulders and in side-by-side relation throughout the circumferential length of said shoulders, each of said means including a transition block in engagement with and conforming to each of said shoulders with said transition blocks having straight grooves formed therein with the grooves in the two blocks being opposed to each other, a pair of straight members forming a toggle linkage with one end of each member being complementary with and received in the groove in one of the transition blocks for pivotal movement toward and away from the dead center position of the linkage and effective to force and retain the closure against the stop means as the linkage approaches its dead center, a bracket means extending laterally from one of said members, and adjustable means interconnecting said bracket and the other member and operable to draw said bracket toward said other member to move said linkage toward its dead center position.

6. In a pressure vessel having an opening of circular transverse section provided therein, the combination of a removable closure adapted to be removably disposed in said opening and having a portion disposed within the opening when occupying its closed position, stop means extending radially inward from the wall of the opening and engageable by the inner end of the closure to limit its insertion into said opening, said closure being provided with an annular outwardly facing shoulder adjacent its periphery and the wall of the opening being provided with a similar annular shoulder opposed to that provided on the closure and spaced axially outward thereof, a plurality of locking assemblies disposed about said closure in side-by-side relation and intermediate said opposed shoulders for forcing and retaining said closure against said stop means, each of said assemblies including transition blocks in engagement with the shoulders formed on the closure and the wall of the opening and respectively having generally outwardly and inwardly facing recesses formed therein and extending throughout their length, the axes of said recesses being straight and normal to a plane that contains the axis of the opening and passes through said blocks centrally intermediate the lateral extremities thereof, the surfaces of said recesses being arcuate with the center of the arc lying along the respective axis of the recess, a first member received within the outwardly facing recess in complementary relation therewith for pivotal movement about the axis of said outwardly facing recess, a second member received within the inwardly facing recess in complementary relation therewith for pivotal movement about the axis of said inwardly facing recess, said first and second members being interrelated to form a toggle linkage the dead center position of which lies in a plane containing the two pivotal axes, said members being effective to force said closure against said stop means as they are simultaneously pivoted radially outward of the opening toward their dead center position, a bracket means extending laterally from one of said members, adjustable means interconnecting said bracket and the other member operable to draw said bracket toward said other member to move said linkage toward its dead center position, and means effective to limit the radially outward pivotal movement of said members to prevent the same from being moved past their dead center.

References Cited in the file of this patent
UNITED STATES PATENTS 2,252,488     Bierend ---------------- Aug. 12, 1941